(12) United States Patent
Deloy et al.

(10) Patent No.: US 6,789,921 B1
(45) Date of Patent: Sep. 14, 2004

(54) METHOD AND APPARATUS FOR BACKLIGHTING A DUAL MODE LIQUID CRYSTAL DISPLAY

(75) Inventors: Christian T. Deloy, Marion, IA (US); Roger W. Heidt, Robins, IA (US)

(73) Assignee: Rockwell Collins, Cedar Rapids, IA (US)

( * ) Notice: Subject to any disclaimer, the term of this patent is extended or adjusted under 35 U.S.C. 154(b) by 37 days.

(21) Appl. No.: 10/396,303

(22) Filed: Mar. 25, 2003

(51) Int. Cl.[7] .............................................. F21S 13/14
(52) U.S. Cl. ...................... 362/252; 362/555; 362/238; 362/246; 362/294
(58) Field of Search .................... 315/112, 113, 315/312, 363, 32, 50, 76; 313/1, 11, 42, 45, 46, 110, 112, 116, 117; 362/551, 555, 559, 561, 227, 235, 236, 238, 240, 244, 246, 248, 249, 252, 257, 294, 217, 345, 362, 368, 373, 800, 23, 28, 29, 26, 27

(56) References Cited

U.S. PATENT DOCUMENTS

| | | | | |
|---|---|---|---|---|
| 5,036,442 A | * | 7/1991 | Brown | ....................... 362/102 |
| 5,390,093 A | * | 2/1995 | Himeno et al. | ............. 362/249 |
| 5,857,767 A | * | 1/1999 | Hochstein | ................... 362/294 |
| 5,890,794 A | * | 4/1999 | Abtahi et al. | ............... 362/294 |
| 6,517,218 B2 | * | 2/2003 | Hochstein | ................... 362/294 |
| 6,621,222 B1 | * | 9/2003 | Hong | .......................... 315/51 |

* cited by examiner

Primary Examiner—Thomas M. Sember
Assistant Examiner—Ismael Negron
(74) Attorney, Agent, or Firm—Nathan O. Jensen; Kyle Eppele

(57) ABSTRACT

An LED backlight system for dual mode operation with an NVIS system which utilizes non-edge lit night mode LED and a thermal conduction path from the day mode array of LEDS to a rearward disposed heat sink which cross the night mode array of LEDS. The system includes first and second LED arrays, the second array being located behind the first array. Light from the second LED array pass through a plurality of apertures located on the circuit card supporting the first array.

20 Claims, 4 Drawing Sheets

US 6,789,921 B1

METHOD AND APPARATUS FOR BACKLIGHTING A DUAL MODE LIQUID CRYSTAL DISPLAY

FIELD OF THE INVENTION

The present invention generally relates to liquid crystal displays (LCDs), and more particularly relates to dual mode backlit LCDs, and even more particularly relates to methods and apparatus for backlighting LCD's with dual modes without the use of an edge lighted or waveguide lighted backlighting scheme.

BACKGROUND OF THE INVENTION

In the past, LCDs have been used in a wide variety of environments, including displays within the cockpit of an aircraft. In some aircraft it is desirable to have LCDs with dual mode backlighting. These displays have a mode for use during daylight operation and a mode for nighttime operation when a pilot is using a night vision imaging system, hereafter NVIS. It has been well known to use filtered light during the NVIS mode. Filtering the light enhances the performance of the display when NVIS equipment is used. Without other changes, the filtering which helps NVIS performance degrades the optical performance (mainly color and brightness) of the same LCD in daylight.

One example of a prior art system is shown in FIG. 1, which includes a heat sink with a plurality of light pipes therethrough disposed about a night mode array of light emitting diodes (LEDs).

While these LCD backlighting systems may have many advantages in particular uses, they also have created challenges. One common challenge created by these designs is the relatively high temperatures experienced by the day and night mode LEDs and the concomitant lower luminance, shorter life and/or increased power consumption.

Consequently, there exists a need for improved methods and apparatuses for backlighting compact dual mode LCDs.

SUMMARY OF THE INVENTION

It is an object of the present invention to provide an LCD which is highly compact.

It is another object of the present invention to provide an LCD with improved luminance and luminance uniformity.

It is yet another object of the present invention to provide an LCD with extended MTBF.

It is yet another object of the present invention to provide an LED backlight for an LCD which consumes less power.

It is a feature of the present invention to utilize a thermal path across a night mode LED array with a heat sink disposed behind the night mode LED array.

It is a feature of the present invention to package day and night mode LED arrays with reduced detriment to the main cooling structure (heat sink).

The present invention is an apparatus and method for backlighting an LCD which is designed to satisfy the aforementioned needs, provide the previously stated objects, include the above-listed features and achieve the already articulated advantages. The present invention is carried out in a "wasted space-less" and "wasted power-less" manner in a sense that the size of a fully functional dual mode luminare and the power consumed has been reduced.

Accordingly, the present invention is an LCD system including a predetermined sequence and orientation of backlighting LED elements which includes a day mode LED array and a separate night mode LED array where a thermal conduction path from said day mode LED array extends across the night mode LED array to a heat sink disposed behind both LED arrays.

BRIEF DESCRIPTION OF THE DRAWINGS

The invention may be more fully understood by reading the foregoing description of the preferred embodiments of the invention, in conjunction with the appended drawing wherein.

DETAILED DESCRIPTION

Figure 1:
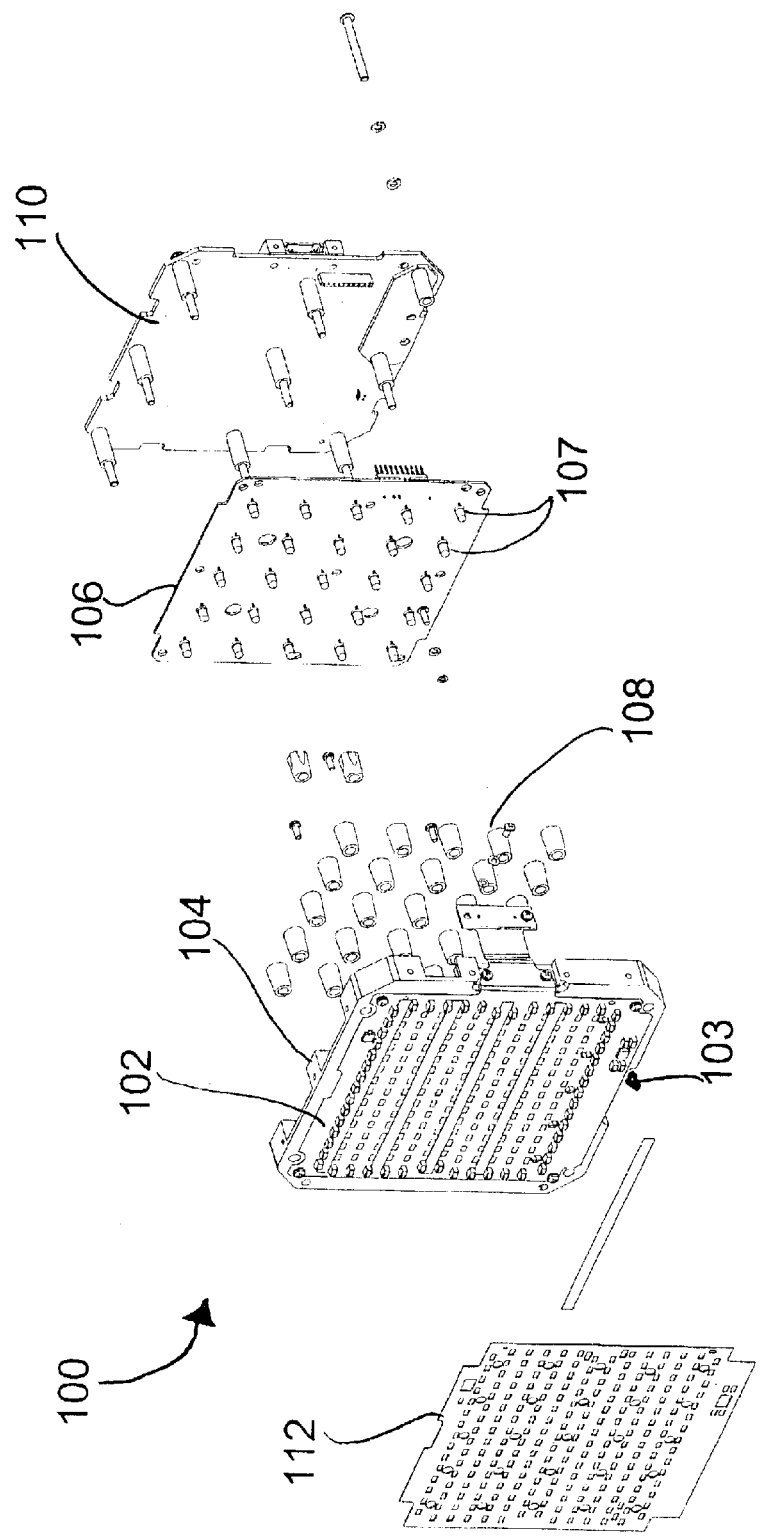
FIG. 1 is an exploded view of a prior art LED backlight.

Now referring to the drawings wherein like numerals refer to like matter throughout, there is shown an LED backlight system of the prior art, generally designated 100. LED backlight system 100 includes a day mode circuit board 102 having a day mode array 103 of LEDs disposed thereon. Day mode circuit board 102 is a flex circuit. Day mode circuit board 102 is mounted on light piped heat sink 104, which is made of AL 6061. A night mode circuit board 106 with a night mode array of LEDs 107 disposed thereon is coupled to the rear side of light piped heat sink 104. A plurality of light pipe spacers 108 is disposed in the light pipes in light piped heat sink 104. A backlight driver 110 is disposed rearward of all of the active components. A reflector 112 can be disposed forward of the active components. The LED backlight system shown in FIG. 1 is similar to the prior art LED backlight manufactured by Rockwell Collins Inc. of Cedar Rapids, Iowa, USA, and known as the Back Light Assembly, Night Vision-5ATI, having model number 987-2737-100.

Figure 2:
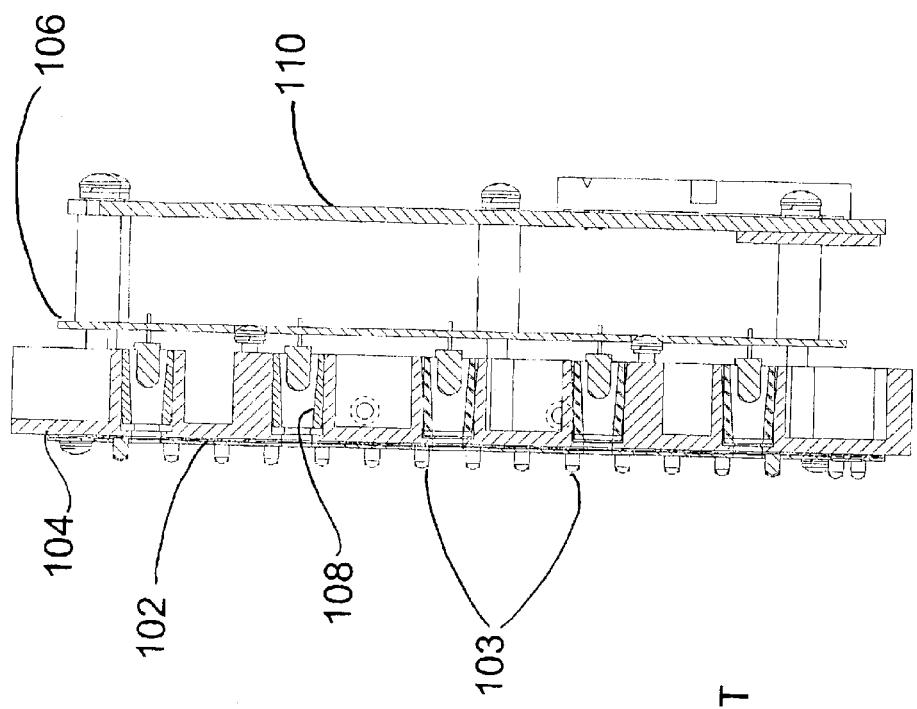
FIG. 2 is a cross-sectional view of a prior art LED backlight of FIG. 1, in a non-exploded view.

A better understanding of the prior art LED backlight as mentioned above and as shown in FIG. 1 can be obtained by now referring to FIG. 2, which shows a cross-sectional view. It is clearly seen that the light piped heat sink 104 is not located behind the night mode circuit board 106.

Figure 3:
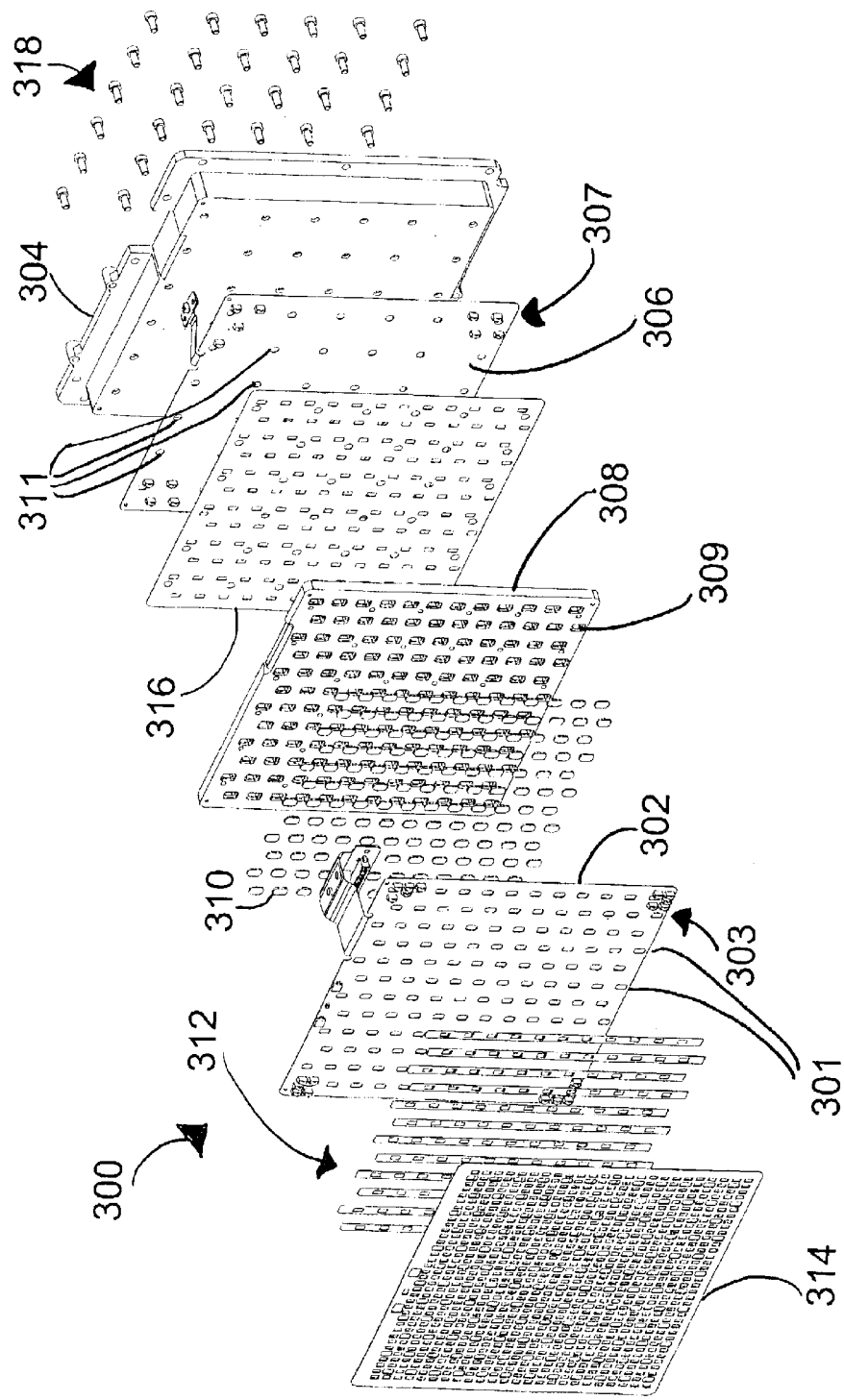
FIG. 3 is an exploded view of an LED backlight of the present invention.

Now referring to FIG. 3, there is shown an exploded view of the LED backlight of the present invention, generally designated 300, which includes a day mode LED flex circuit board 302, which is preferably a multi-layered flex circuit with a thin layer of thermally-conductive pressure sensitive adhesive laminated to the back side; day mode LED flex circuit board 302 has attached thereto a day mode array of LEDs 303 which can be any suitable LED, which is preferably a surface mount device that emits white light. Day mode LED flex circuit board 302 is shown with a plurality of NVIS enabling apertures 301 therein. All of the LEDs of day mode array of LEDs 303 are not shown in FIG. 3. To aid in the views of NVIS enabling apertures 301, only a few LEDs in the corners of day mode array of LEDs 303 are shown. Day mode LED flex circuit board 302 is coupled to heat spreader 308, which is made of AL 6061, and a plurality of NVIS filters 310 is disposed between day mode LED flex circuit board 302 and heat spreader 308 in NVIS enabling passages 309 in heat spreader 308 which are in registration with the NVIS enabling apertures 301 in day mode LED flex circuit board 302. NVIS filters 310 are well known in the art, and are able to effectively attenuate the near infrared wavelengths of light required for NVIS operation.

Night mode LED thin flex circuit board 306 has coupled thereto a night mode array of LEDs 307. Night mode LED flex circuit board 306 is shown with a plurality of fastener receiving holes 311 therein. All of the LEDs of night mode array of LEDs 307 are not shown in FIG. 3. To aid in the views of fastener receiving holes 311, only a few LEDs in the corners of night mode array of LEDs 307 are shown. Preferably night mode LED thin flex circuit board 306 is a thin, single layer flex circuit with a maximum thickness of 0.009", and a thin layer of thermally-conductive pressure sensitive adhesive laminated to the back side, which is not shown in the Figures because it is preferably a very thin layer; other alternate circuit boards could be employed. It is preferred that the thermal insulating properties of the night mode LED thin flex circuit board 306 be known as tailored, depending upon various design choices being made.

Disposed between night mode LED thin flex circuit board 306 and heat spreader 308 is an electrically insulating thermally conductive pad 316 which has a plurality of night mode LED receiving holes and fastener receiving holes therein. Electrically insulating thermally conductive pad 316 is preferably made of a polyimide film coated with an impregnated silicone elastomer, and has a thickness, such as 0.007" maximum.

Rearward disposed heat sink 304 is coupled to night mode LED thin flex circuit board 306. Preferably, rearward disposed heat sink 304 is made of AL 6061 or other suitable material, and preferably, rearward disposed heat sink 304 is configured with cooling fins, etc.

An array of fasteners 318 are used to couple rearward disposed heat sink 304 to heat spreader 308, and create a suitable compression of electrically insulating thermally conductive pad 316 and night mode LED thin flex circuit board 306 between heat sink 304 and heat spreader 308 to improve heat conduction away from day mode LED flex circuit board 302. The various other layered components of the present invention may be held by adhesives, such as pressure-sensitive adhesives or others.

Figure 4:
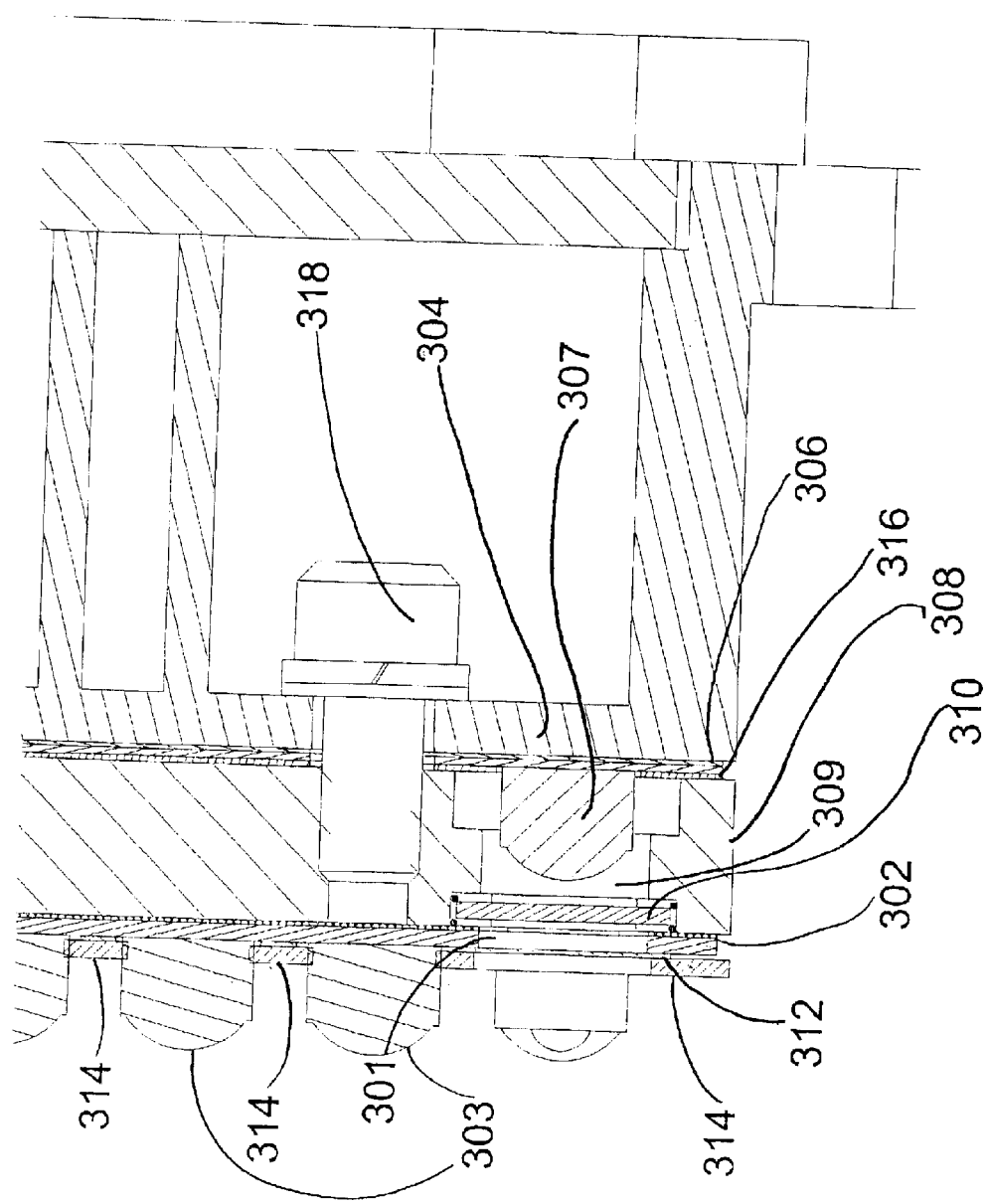
FIG. 4 is a cross-sectional view of an LED backlight of the present invention.

In operation, and now referring to FIGS. 3 and 4, the apparatus and method of the present invention could function as follows:

During daytime operation, the day mode array of LEDs 303 is used to illuminate the LCD, while the night mode array of LEDs 307 may be either on or off. With the present invention, the density of day mode array of LEDs 303 can be relatively high. The heat generated by day mode array of LEDs 303 is conducted through heat spreader 308 across electrically insulating thermally conductive pad 316 across night mode LED thin flex circuit board 306 and into rearward disposed heat sink 304, where it can be dissipated through cooling fins or other means.

During nighttime operation when an NVIS is being employed, the day mode array of LEDs 303 is disabled, leaving only the night mode array of LEDs 307. The light from night mode array of LEDs 307 passes though holes in electrically insulating thermally conductive pad 316 through NVIS enabling passages 309 disposed in heat spreader 308, through NVIS filters 310 which provide the requisite light characteristic to be used in conjunction with an NVIS. The light then further passes through NVIS enabling apertures 301 in day mode LED flex circuit board 302 and is incident upon holographic thin film diffuser strips 312, which spread out the then filtered light to enhance luminance uniformity across the face of the LCD. Finally, the light passes through holes in light reflector 314, which is used to capture and redirect later reflected light into more useful directions. The heat generated by night mode array of LEDs 307 is conducted across night mode LED thin flex circuit board 306 and into rearward disposed heat sink 304, where it can be dissipated through cooling fins or other means.

It is thought that the method and apparatus of the present invention will be understood from the foregoing description and that it will be apparent that various changes may be made in the form, construct steps and arrangement of the parts and steps thereof without departing from the spirit and scope of the invention or sacrificing all of their material advantages. The form herein described is merely a preferred exemplary embodiment thereof.

We claim:

1. A backlight for a dual mode night vision image system liquid crystal display comprising:

a first array of light emitting diodes (LEDs) disposed on a first circuit card;

said first array having a substantially planar illuminated first side and having a substantially rectangular shape of a predetermined sized rectangle;

said first circuit card having a predetermined first circuit card thickness;

a second array of LEDs disposed on a second circuit card;

said second array having a substantially planar illuminated second side and having said substantially rectangular shape of said predetermined sized rectangle;

said second circuit card having a second circuit card thickness;

said second side being disposed behind said first side;

said first circuit card having a plurality of night mode enabling apertures therethrough which permit light generated from behind said first side by said second array to pass through;

a heat sink disposed behind said second side; said heat sink having a front side with said substantially rectangular shape of said predetermined sized rectangle; and, said heat sink not being separated from said second side by a substantially planar air gap which is more than 4 times as thick as said second circuit card thickness.

2. A backlight for a dual mode night vision image system liquid crystal display comprising:

a first array of light emitting diodes (LEDs);

said first array having an illuminated first side and a non-illuminated first side which is disposed behind said illuminated first side; said first array having a predetermined shape and disposed in a first plane;

a second array of LEDs;

said second array disposed in a second plane and having an illuminated second side, a second array perimeter edge and having a second array shape which is substantially said predetermined shape;

said second side being disposed behind said first side;

said first circuit array having a plurality of night mode enabling apertures therethrough which permit light generated by said second array to pass through;

a heat sink disposed behind said second array; said heat sink having a front side with a front side shape which is substantially said predetermined shape;

a heat spreader having a heat spreader shape which is substantially said predetermined shape and disposed between said first array and said second array;

said heat spreader having holes therein which are configured to allow light generated by said second array to propagate forward to said first array;

said heat spreader having structure which substantially prohibits free airflow between said first array and said second array;

said second array being substantially free from exposure to free airflow except along said second array perimeter edge; and, where said free airflow is in a direction which is parallel with a said first plane and said second plane.

3. A system of claim 2 further comprising:

means for reducing a separation distance between said heat spreader and said heat sink.

4. A system of claim 3 further comprising a plurality of light filters associated with a plurality of LEDs in said second array.

5. A system of claim 4 further comprising an electrically insulating thermally conductive pad disposed between said heat spreader and said second array.

6. A system of claim 5 wherein said second array is disposed on a front side of flex circuit.

7. A system of claim 6 wherein said predetermined shape is substantially rectangular.

8. A system of claim 7 wherein said flex circuit is a single layer flex circuit with a thermally conductive pressure sensitive adhesive disposed on a back side of said flex circuit.

9. A system of claim 8 wherein said flex circuit has a maximum thickness which is less than 0.01 inches.

10. A system of claim 9 wherein said first array is disposed upon a multilayer first array flex circuit.

11. A method of backlighting a dual mode liquid crystal display comprising the steps of:

providing a first array of light emitting diodes (LEDs) which propagates light in a forward direction;

providing a second array of LEDs, disposed behind said first array, said second array of LEDs propagates light in said forward direction through said first array; said second array having a predetermined shape;

providing a heat sink having a heat receiving side having a shape which is substantially said predetermined shape, said heat sink coupled at a back side of said second array such that substantially no airflow occurs between said second array and said heat receiving side; and, transferring heat generated by said first array across said second array to said heat sink.

12. A method of claim 11 further comprising the steps of:

filtering light from said second array so as to have differing spectral characteristics from light generated by said first array.

13. A method of claim 12 further comprising the steps of:

providing a heat spreader disposed between said first array and said second array.

14. A method of claim 13 further comprising the steps of:

providing an electrically insulating thermally conductive pad between said heat spreader and said second array.

15. A method of claim 12 further comprising the steps of:

providing a light diffuser to disperse light generated by said second array.

16. A method of claim 12 further comprising the steps of:

providing a light reflector disposed in front of said first array.

17. A method of claim 12 further comprising the steps of:

reducing a separation distance between said heat spreader and said heat sink by advancing a plurality of screws extending through said second array.

18. A method of claim 17 further comprising the steps of:

substantially prohibiting airflow to occur between said heat receiving surface and said heat spreader where such airflow is in a plane parallel to said heat receiving surface.

19. A method of claim 18 further comprising the steps of:

substantially prohibiting airflow to occur between said heat receiving surface and said first array where such airflow is in a plane parallel to said heat receiving surface.

20. A method of claim 19 wherein said second array is disposed on a flex circuit having a maximum thickness less than 0.01 inches.

* * * * *